(12) United States Patent
Boddy et al.

(10) Patent No.: US 7,267,449 B1
(45) Date of Patent: Sep. 11, 2007

(54) TWIN-ARM VEHICLE MIRROR WITH POWERFOLD AND POWEREXTEND FEATURES

(75) Inventors: Ian Boddy, Ada, MI (US); Keith D. Foote, Kentwood, MI (US); Kenneth C. Peterson, Comstock Park, MI (US)

(73) Assignee: Magna Donnelly Mirrors North America, L.L.C., Kentwood, MI (US)

( * ) Notice: Subject to any disclaimer, the term of this patent is extended or adjusted under 35 U.S.C. 154(b) by 115 days.

(21) Appl. No.: 10/710,995

(22) Filed: Aug. 16, 2004

Related U.S. Application Data

(60) Provisional application No. 60/481,323, filed on Sep. 2, 2003.

(51) Int. Cl.
*G02B 7/182* (2006.01)
(52) U.S. Cl. .................................................. 359/877

(58) Field of Classification Search ................ 359/871, 359/872, 877
See application file for complete search history.

(56) References Cited

U.S. PATENT DOCUMENTS

| 6,439,730 B1 | 8/2002 | Foote et al. | |
| 6,877,868 B2 * | 4/2005 | Olijnyk et al. | ............... 359/841 |

* cited by examiner

*Primary Examiner*—Euncha P. Cherry
(74) *Attorney, Agent, or Firm*—McGarry Bair PC

(57) ABSTRACT

An external rearview mirror assembly comprises an arm assembly comprising a pair of parallel support arms rigidly attached to a pivot tube which connects the arm assembly to a base. The pivot tube is held to the base in a cradle which is securely holds the arm assembly to the base while enabling the arm assembly to pivot relative to the base. A motorized powerfold mechanism is used to fold the reflective element assembly against the vehicle, and a motorized powerextend mechanism is used to adjust the position of the reflective element assembly outwardly of the vehicle.

12 Claims, 18 Drawing Sheets

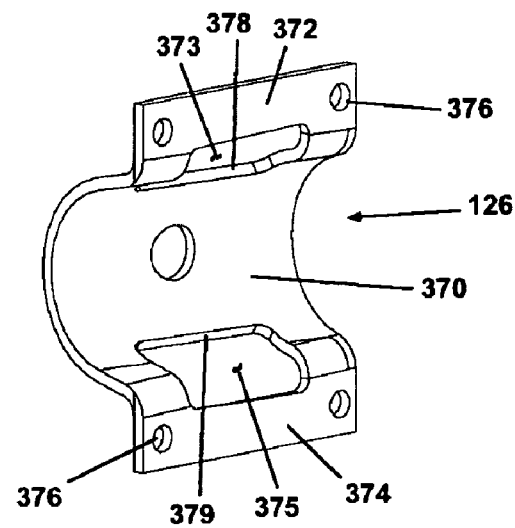
Fig. 20
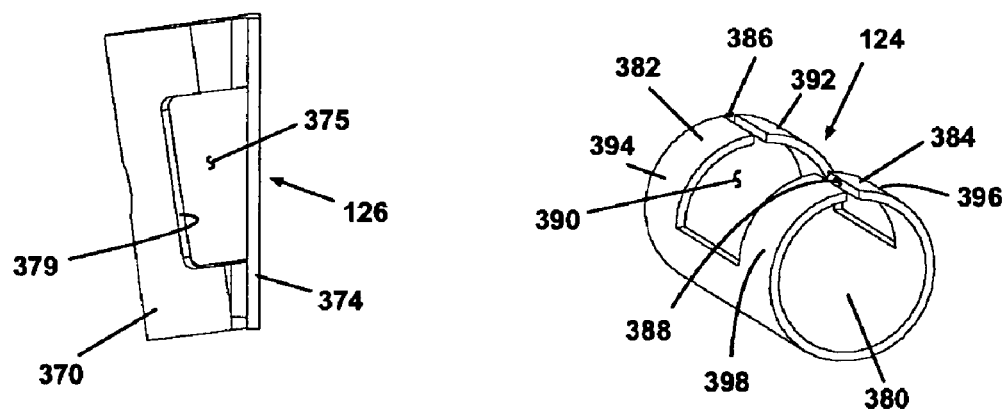
Fig. 21  Fig. 22

TWIN-ARM VEHICLE MIRROR WITH POWERFOLD AND POWEREXTEND FEATURES

CROSS-REFERENCE TO RELATED APPLICATION

This application claims the benefit of U.S. provisional application Ser. No. 60/481,323, filed Sep. 2, 2003, which is incorporated herein in its entirety.

FIELD OF THE INVENTION

The invention relates generally to a rearview mirror assembly for a motor vehicle and more particularly to a rearview mirror assembly which can be selectively extended and folded.

DESCRIPTION OF THE RELATED ART

Motor vehicles typically include at least one external rearview mirror assembly for providing the operator with a rearward view. The mirror assembly typically includes a base for mounting the assembly to the vehicle, a reflective element assembly for providing the rearward view, and an arm assembly connecting the reflective element assembly to the base. It is well known to configure the arm assembly to enable the reflective element assembly to be selectively extended outwardly of the vehicle to provide an enhanced rearward view, such as when a trailer is being towed. It is also well known to configure the connection of the arm assembly to the base to provide for pivotal movement of the arm assembly to enable folding of the mirror assembly against the vehicle. Both the extension and folding assemblies are frequently motorized. An example of an extendable, foldable external rearview mirror is disclosed in U.S. Pat. No. 6,439,730 to Foote et al., which is incorporated herein in its entirety.

Rearview mirror assemblies for large vehicles, such as trucks and sport-utility vehicles, are typically larger than rearview mirror assemblies for automobiles. This increased size results in increased wind forces acting on the mirror assembly, increased weight, and increased loading transmitted through the connection of the arm assembly to the base. Prior art mirror assemblies have attempted to accommodate these increased forces by utilizing an arm assembly that comprises a pair of parallel support arms rigidly connected to a pivot mechanism. However, the pivot mechanism remains a location of structural weakness and potential mirror assembly failure, leading to frequent repairs, increased costs, and vehicle down time.

SUMMARY OF THE INVENTION

A vehicular mirror system comprises a base adapted to be mounted to the vehicle, the base comprising a cradle extending outwardly therefrom, a reflective element assembly for providing a rearward reflective view to an operator of the motor vehicle, a support tube assembly attached to the reflective element assembly and supported in the cradle, a motorized powerfold assembly mounted to at least one of the base and the reflective element assembly for selectively pivoting the support tube assembly alongside the vehicle or laterally outwardly from the vehicle, and a motorized powerextend assembly mounted to at least one of the base and the reflective element assembly for selectively extending the reflective element assembly laterally outwardly from the vehicle or inwardly toward the vehicle, wherein the support of the support tube assembly by the cradle has increased strength and resistance to vibration while enabling the support tube assembly to pivot relative to the base.

The vehicular mirror system can further comprise a clamp member attached to the cradle to form a channelway for receiving the support tube assembly. The support tube assembly can comprise a pair of parallel extender tubes rigidly attached at one end to a pivot tube, and the pivot tube can be received in the channelway with the extender tubes extending outwardly from the base.

The vehicular mirror system can alternately comprise a base adapted to be mounted to the vehicle, the base comprising a cradle extending outwardly therefrom, a reflective element assembly for providing a rearward reflective view to an operator of the motor vehicle a support tube assembly attached to the reflective element assembly and supported in the cradle a motorized powerfold assembly mounted to at least one of the base and the reflective element assembly for selectively pivoting the support tube assembly alongside the vehicle or laterally outwardly from the vehicle, at least one stop provided on at least one of the support tube assembly and the base, the stop defining a limit of a normal range of pivotal movement of the support tube assembly relative to the base, and a retainer provided on the other of the support tube assembly and the base, wherein the at least one stop engages the retainer during pivotal movement within the normal range and disengages from the retainer during at least one of manual and overtravel movement of the support tube assembly relative to the base.

The at least one stop can comprise a cylindrical body attached to an outer surface of the support tube assembly. The at least one stop can comprise two stops, the first stop corresponding to a first position of the reflective element assembly laterally outwardly from the vehicle, and the second stop corresponding to a second position of the reflective element assembly inwardly toward the vehicle.

The retainer can comprise a plate having a crimp therein for receiving the at least one stop, and can be movably attached to the base adjacent the cradle. The retainer can be biased, such as by a spring, away from the cradle and toward the support tube assembly.

The vehicular mirror system can further comprise a clamp for attachment to the cradle to form a cylindrical channelway, and the support tube assembly can comprise a pair of parallel extender tubes rigidly attached at one end to a pivot tube so that the pivot tube can be received in the channelway with the extender tubes extending outwardly from the base.

The vehicular mirror system can alternately comprise a base adapted to be mounted to the vehicle, the base comprising a cradle extending outwardly therefrom, a reflective element assembly for providing a rearward reflective view to an operator of the motor vehicle, a support tube assembly attached to the reflective element assembly and supported in the cradle, a motorized powerextend assembly mounted to at least one of the base and the reflective element assembly for selectively extending the reflective element assembly laterally outwardly from the vehicle or inwardly toward the vehicle, and a bracket assembly formed from a first portion and a cooperatively juxtaposed second portion, wherein the first and second portions of the bracket assembly capture a portion of the support tube assembly and move with a driving force imparted by the powerextend assembly.

The support tube assembly can comprise a pivot tube attached to a pair of parallel extender tubes so that the pivot tube is supported in the cradle. The first portion of the bracket assembly can define a pair of semicylindrical channelways, the second portion of the bracket assembly can define a pair of semicylindrical channelways, and an assemblage comprising the first portion attached to the second portion can define a pair of cylindrical channelways for receipt of the extender tubes therethrough.

The first portion of the bracket assembly can comprise an attachment tube, the second portion of the bracket assembly can comprise a housing, and the attachment tube can be inserted into the housing to attach the first portion to the second portion. A spring can urge the first portion of the bracket assembly toward the second portion of the bracket assembly to develop a frictional force between the bracket assembly and the extender tubes.

A clamp can be to the cradle to form a cylindrical channelway, the support tube assembly can comprise a pair of parallel extender tubes rigidly attached at one end to a pivot tube, and the pivot tube can be received in the channelway with the extender tubes extending outwardly from the base.

The vehicular mirror system can further comprise a motorized powerfold assembly mounted to at least one of the base and the reflective element assembly for selectively pivoting the support tube assembly alongside the vehicle or laterally outwardly from the vehicle, or a motorized powerextend assembly mounted to at least one of the base and the reflective element assembly for selectively extending the reflective element assembly laterally outwardly from the vehicle or inwardly toward the vehicle.

The vehicular mirror system can alternately comprise a base adapted to be mounted to the vehicle, the base comprising a cradle extending outwardly therefrom, a reflective element assembly for providing a rearward reflective view to an operator of the motor vehicle, a support tube assembly comprising a pair of arms interconnected by a support element, wherein the pair of arms are attached to the reflective element assembly and the support element is received in the cradle, and a retainer mounted to the base and extending across at least a portion of the cradle to retain the support element therein, wherein the support of the support tube assembly by the cradle has increased strength and resistance to vibration while enabling the support tube assembly to pivot relative to the base.

BRIEF DESCRIPTION OF THE DRAWINGS

FIG. 20 is a perspective view of a retainer clamp comprising a portion of the detent assembly shown in FIG. 15.

FIG. 21 is a side view of the retainer clamp shown in FIG. 20.

FIG. 22 is a perspective view of a detent liner comprising a portion of the detent assembly shown in FIG. 15.

DESCRIPTION OF AN EMBODIMENT OF THE INVENTION

Figure 1:
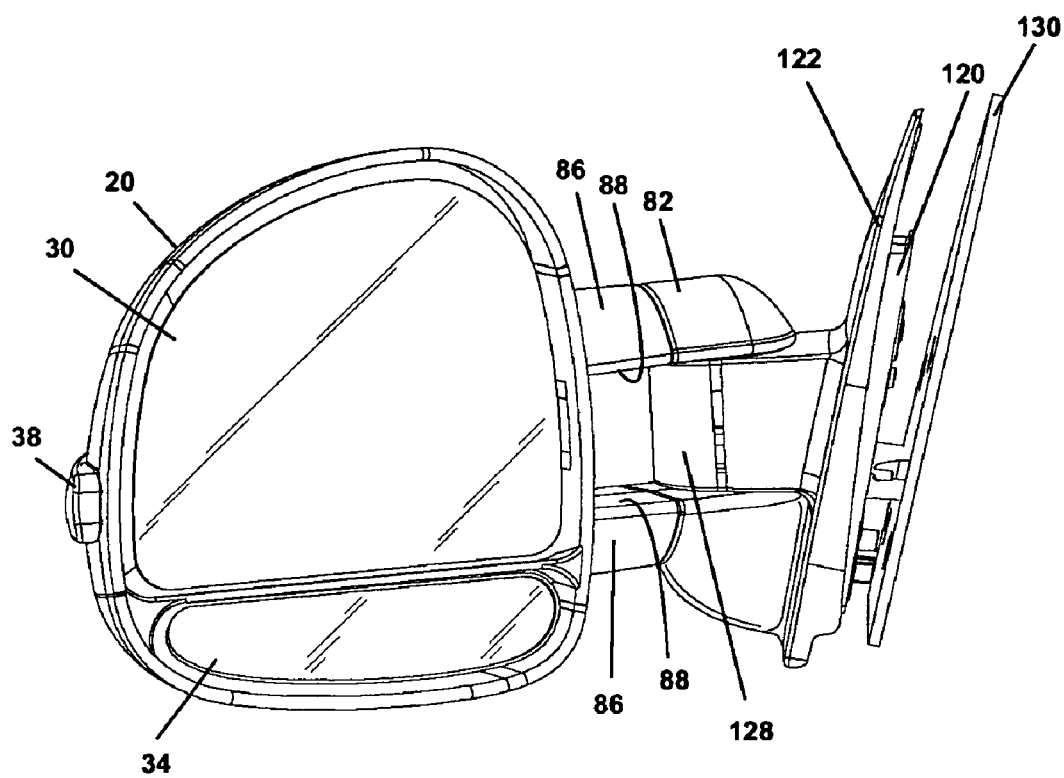
FIG. 1 is a perspective view of a vehicle rearview mirror assembly according to the invention.
Figure 2:
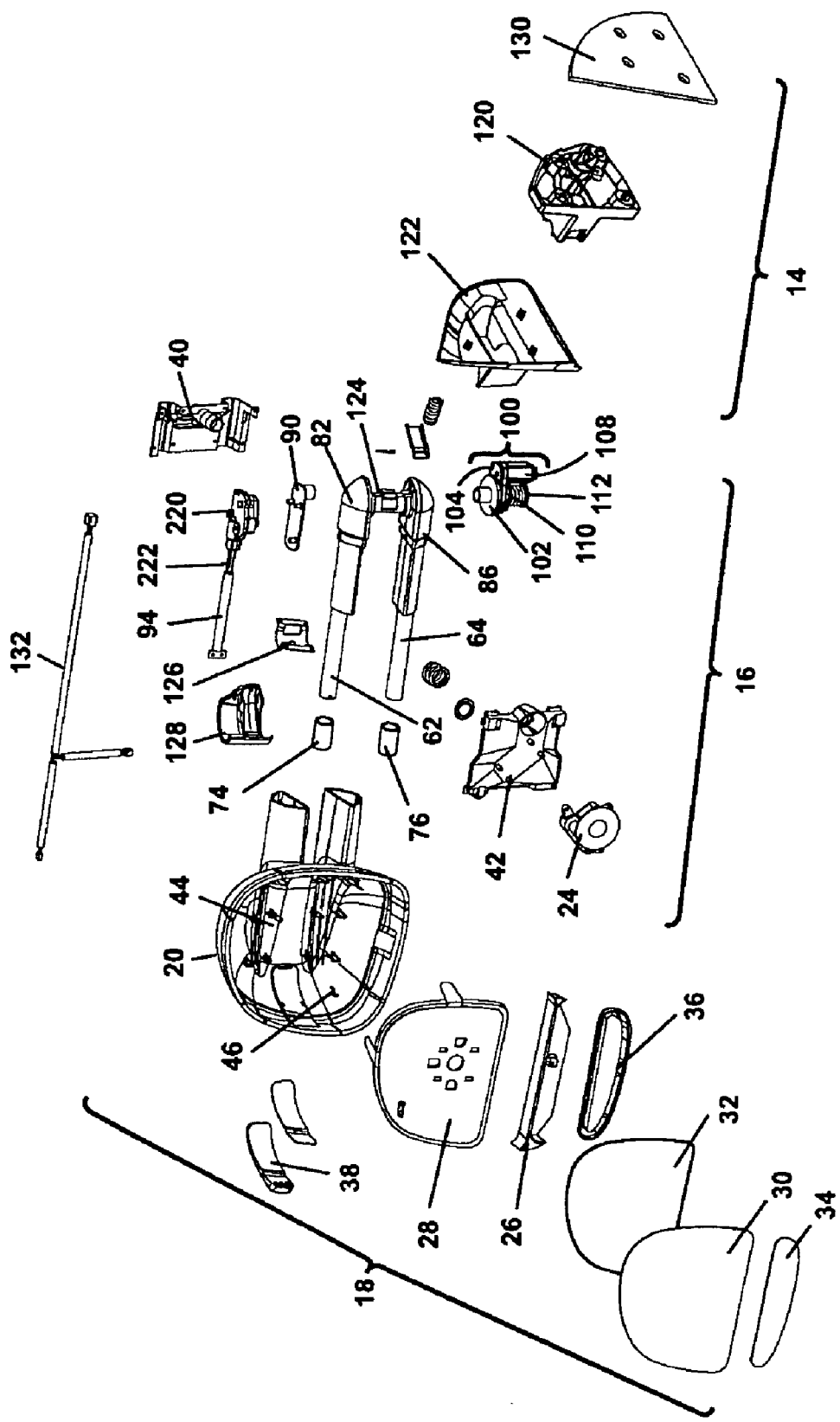
FIG. 2 is an exploded view of the rearview mirror assembly shown in FIG. 1.
Figure 3:
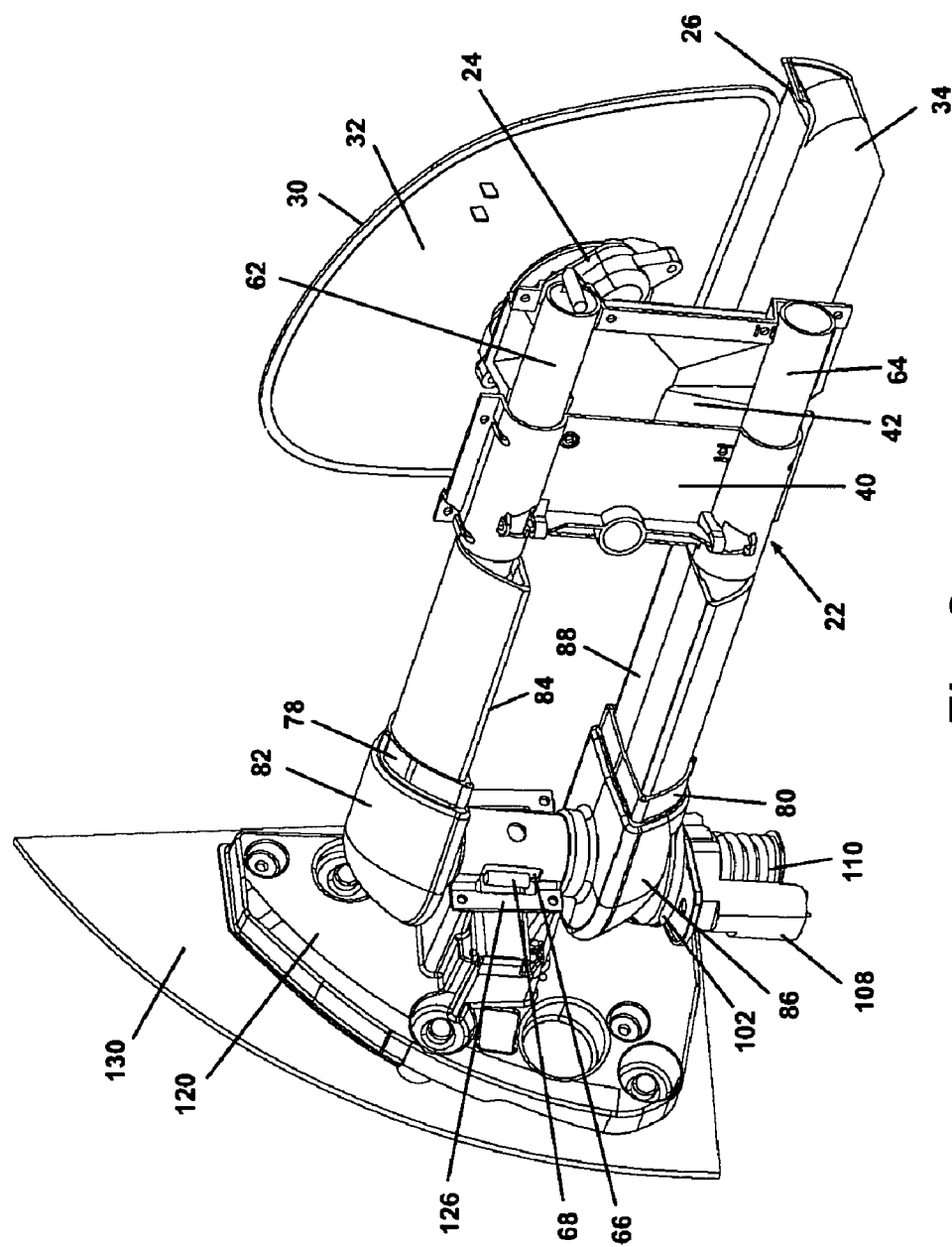
FIG. 3 is a perspective view of the rearview mirror assembly shown in FIG. 1 with a mirror assembly housing removed for convenience to show the interior of the mirror assembly comprising a powerfold assembly, a pivot connection, and a dual-arm bracket assembly.

Referring to the Figures, and in particular to FIG. 1, a vehicle mirror assembly 10 according to the invention is adapted for attachment to the exterior of a motor vehicle (not shown). Referring also to FIGS. 2 and 3, the vehicle mirror assembly 10 comprises a base assembly 14 adapted for fixed mounting to the motor vehicle, an arm assembly 16 pivotably attached to the base assembly 14 as hereinafter described, and supporting a reflective element assembly 18 for providing the operator of the motor vehicle with a reflective rearward view. An example of such a mirror assembly is described in U.S. Pat. No. 6,439,730 to Foote et al., which is incorporated herein in its entirety. The reflective element assembly 18 shares several elements of a well-known vehicle rearview mirror assembly, including a tilt actuator 24, a bezel 26, a reflective element mounting panel 28, a reflective element 30, a heating element 32, a spotter element 34, and a spotter element mounting panel 36. The reflective element assembly 18 is also shown comprising a shell 20 housing the aforementioned elements 24-36, an optional light assembly 38, and a shell bracket assembly 22 according to the invention. A well-known wire harness 132 is also provided for supplying power to the tilt actuator 24, the heating element 32, the light assembly 38, a hereinafter described powerextend actuator 92 and pivot actuator assembly 100, and other electric powered elements, such as an electrochromic dimming element.

Figure 4:
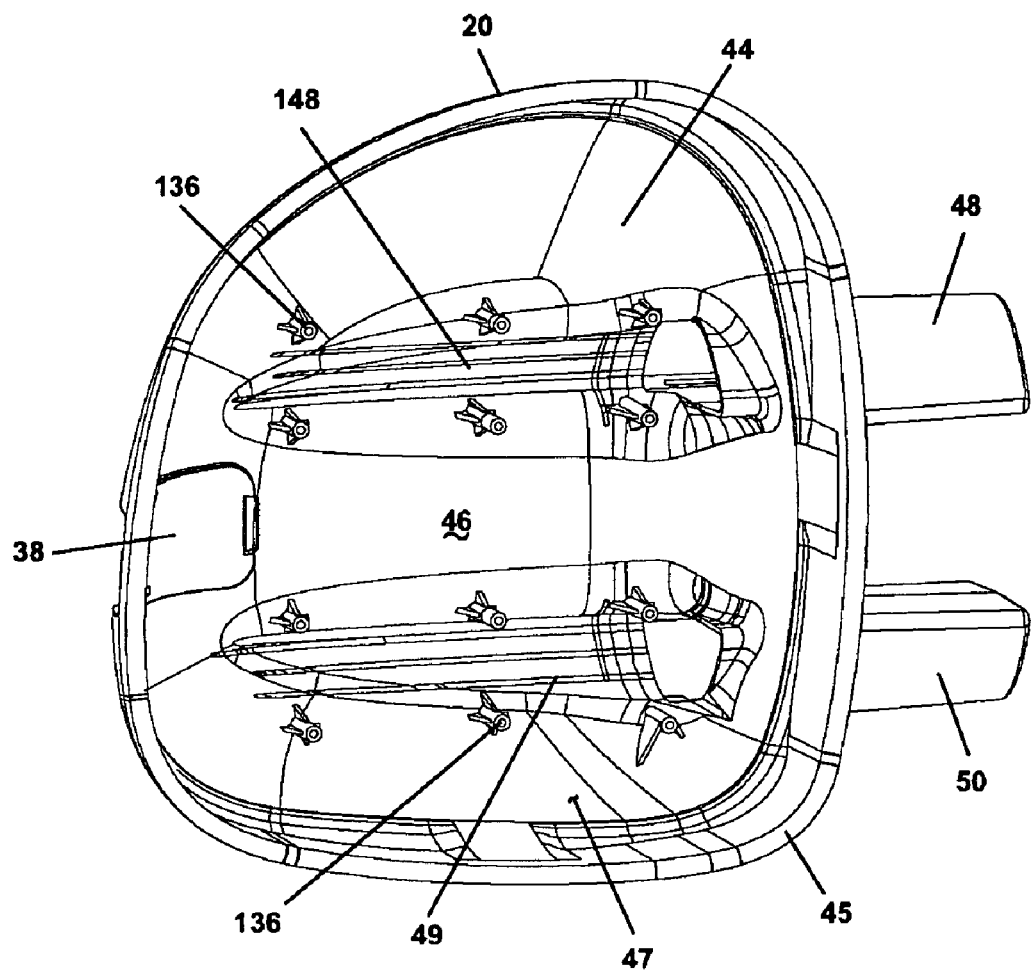
FIG. 4 is a first perspective view of a portion of the mirror assembly housing adapted to enclose a reflective element assembly.
Figure 5:
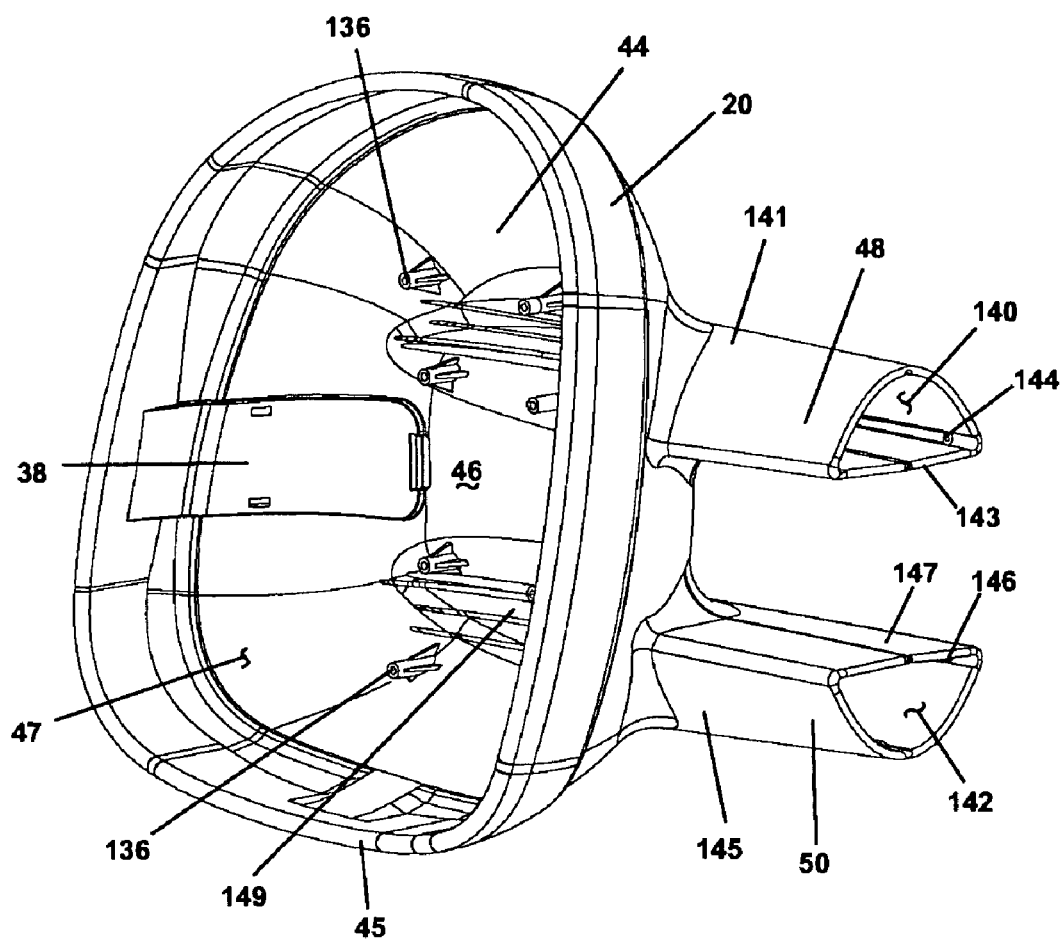
FIG. 5 is a second perspective view of the mirror assembly housing shown in FIG. 4.

Referring also to FIGS. 4 and 5, the shell 20 comprises a curved wall 44 defining a concave cavity 46 terminating in a peripheral rim 45 defining a reflective element opening 47 conforming in size and general shape to the elements 24-36 and the shell bracket assembly 22. Extending laterally from the wall 44 are an upper arm sleeve 48 and a lower arm sleeve 50 in generally parallel, spaced-apart juxtaposition. The upper arm sleeve 48 is an elongated, hollow tube-like body having a somewhat D-shaped cross-section comprising a curved wall 141 and a planar wall 143 and defining an upper sleeve channelway 140 fluidly connected to the cavity 46. The lower arm sleeve 50 is an elongated, hollow tube-like a body having a somewhat D-shaped cross-section comprising a curved wall 145 and a planar wall 147 and defining a lower sleeve channelway 140 fluidly connected to the cavity 46. The upper arm sleeve 48 transitions in the cavity 46 to an upper channel 148 extending laterally along an upper portion of the wall 44. The lower arm sleeve 50 transitions in the cavity 46 to a lower channel 149 extending laterally along a lower portion of the wall 44. A cylindrical fastener boss 144 extends longitudinally into the upper sleeve channelway 140 along the planar wall 143. A cylindrical fastener boss 146 extends longitudinally into the lower sleeve channelway 142 along the planar wall 147. Each fastener boss 144, 146 is provided with a fastener bore extending coaxially therethrough for receipt of a fastener, such as a threaded screw. A plurality of parallel mounting posts 136 extend orthogonally from the wall 44 into the cavity 46, preferably along the upper channel 148 and the lower channel 149, and are adapted with coaxial bores for receipt of fasteners, such as threaded fasteners.

Figure 6:
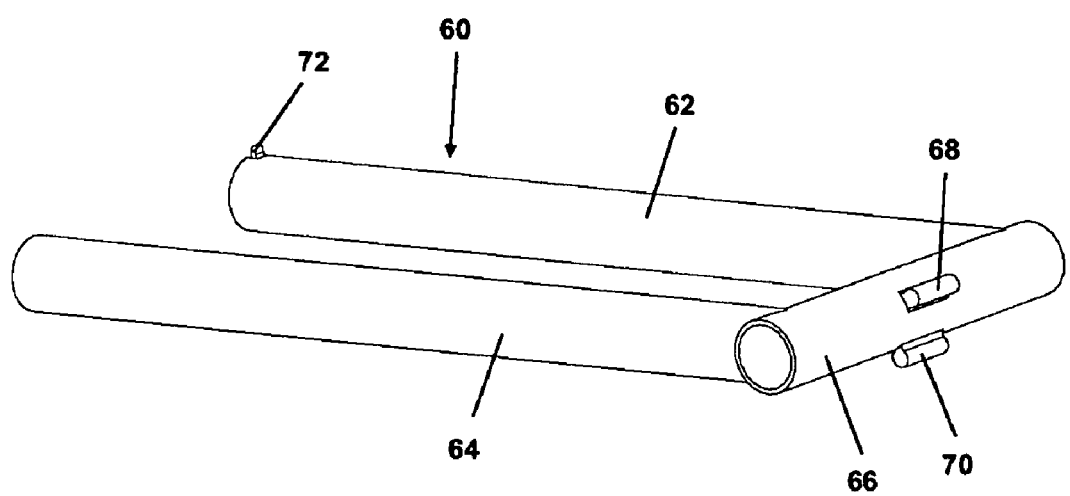
FIG. 6 is a perspective view of a tube assembly comprising a portion of the rearview mirror assembly shown in FIG. 1.
Figure 17:
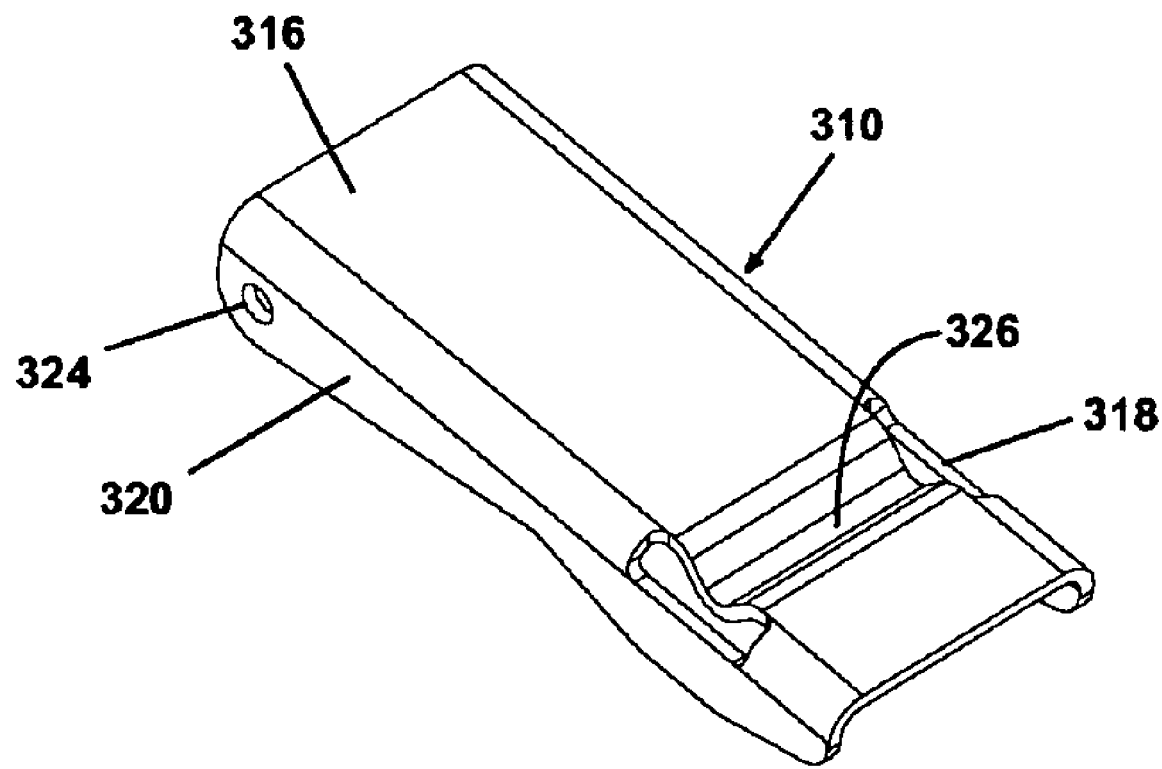
FIG. 17 is a second perspective view of the retainer shown in FIG. 16.
Figure 18:
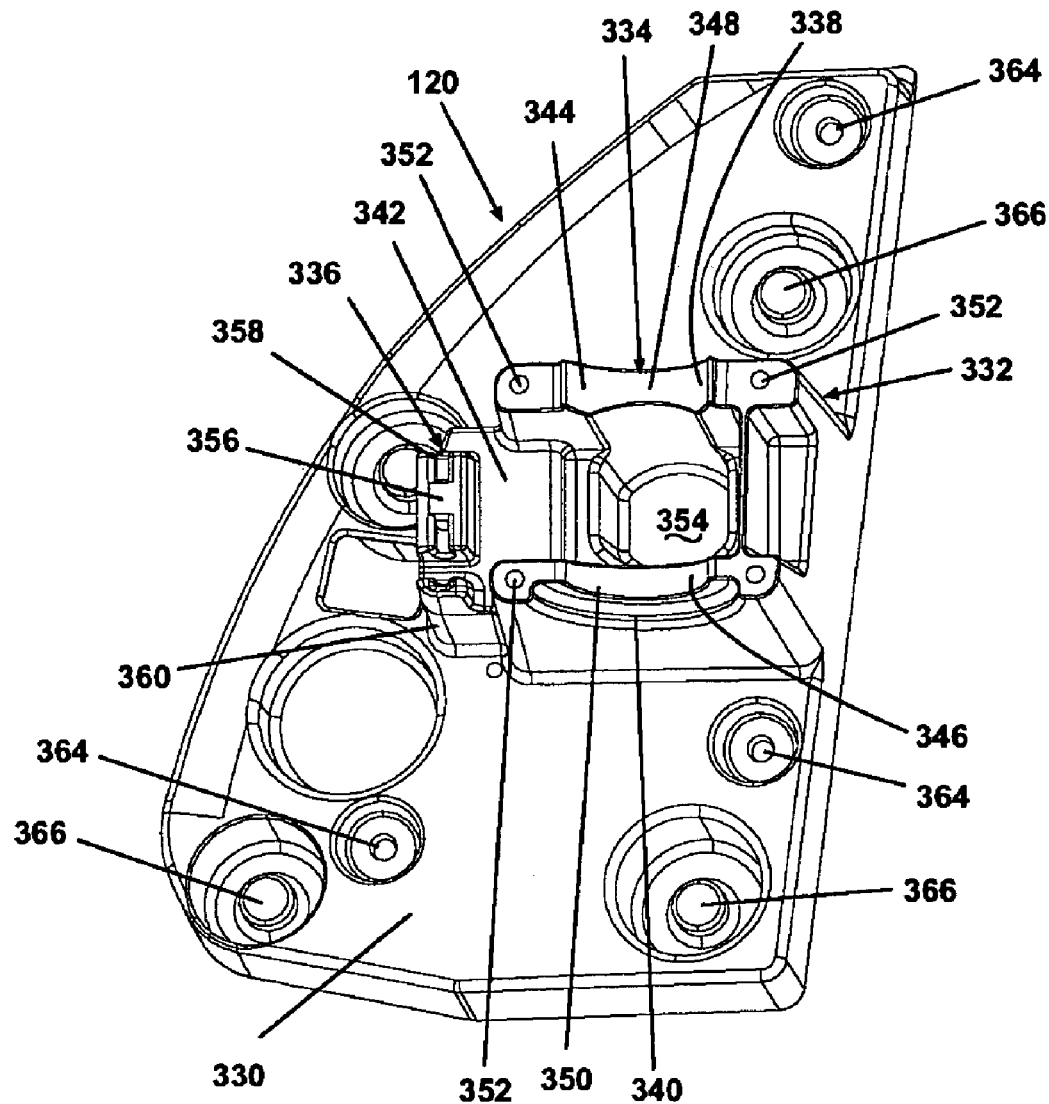
FIG. 18 is a perspective view of the base shown in FIG. 15.

As shown also in FIG. 6, a tube assembly 60 is an elongated tubular framework comprising an upper extender tube 62 and a lower extender tube 64 in parallel, spaced-apart juxtaposition and adapted for slidable insertion into the upper arm sleeve 48 and the lower arm sleeve 50, respectively. The upper extender tube 62 and the lower extender tube 64 are rigidly attached to a support element, hereinafter referred to as a pivot tube 66, in generally orthogonal conformance to form a rectilinear, somewhat U-shaped frame 60. Preferably, the tube assembly 60 comprises a light-weight steel or aluminum having a sufficient size and strength for the purposes described herein. The upper extender tube 62 is provided at a free end thereof with an upper tube boss 72 extending radially outwardly therefrom. The pivot tube 66 is provided with an elongated rail-like rearward stop 68 and an elongated rail-like forward stop 70 spaced away from the rearward stop 68 and extending radially outwardly from the pivot tube 66. The longitudinal axes of the rearward stop 68 and the forward stop 70 are parallel to the longitudinal axis of the pivot tube 66. When the assembly described herein is used in a manual fold mode (often encountered during overtravel pivoting of the assembly as well as during manual overriding of the powerfold mechanism described herein), at least one of the stops 68, 70 can act as a positioning detent with respect to the description of FIG. 17, below.

An upper linear bearing 74 is a tube-like body having an inner diameter adapted for slidable insertion of the upper extender tube 62 in the upper linear bearing 74. A lower linear bearing 76 is a tube-like body having an inner diameter adapted for slidable insertion of the lower extender tube 64 in the lower linear bearing 76. In one embodiment, the upper linear bearing 74 is adapted with an apertured mounting flanges (not shown) for fixedly attaching the upper linear bearing 74 to the shell 20 in coaxial register with the upper arm sleeve 48 by fasteners inserted through the flanges into the mounting posts 136, to provide a bearing for slidable translation of the shell 20 relative to the upper extender tube 62. The lower linear bearing 76 is adapted with apertured mounting flanges (not shown) for fixedly attaching the lower linear bearing 76 to the shell 20 in coaxial register with the lower arm sleeve 50 by fasteners inserted through the flanges into the mounting posts 136, to provide a bearing for slidable translation of the shell 20 relative to the lower extender tube 64.

Figure 7:
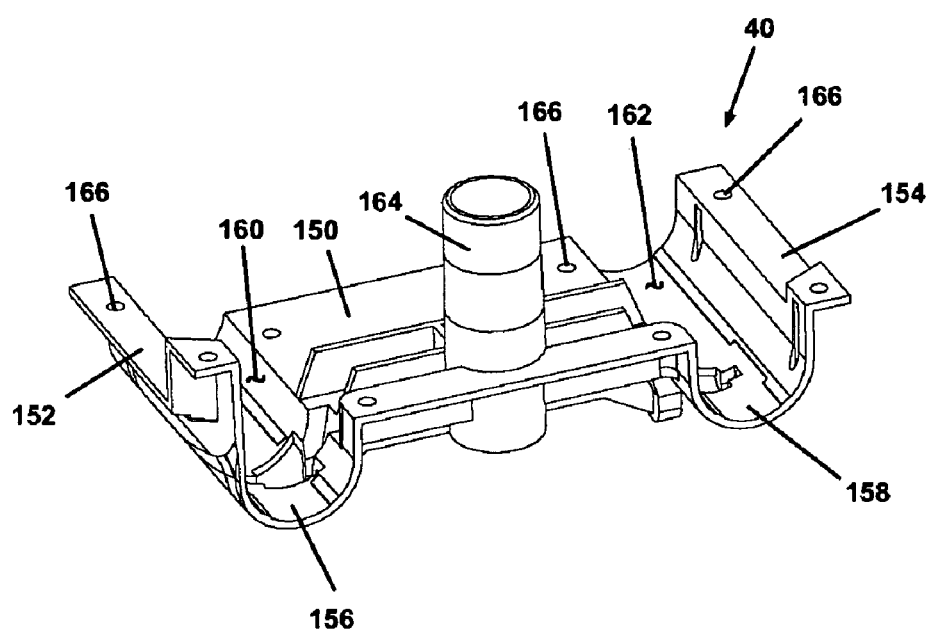
FIG. 7 is a perspective view of a lower shell bracket comprising a portion of the dual-arm bracket assembly shown in FIG. 3.

Referring now to FIG. 7, the lower shell bracket 40 is an irregularly-shaped, generally flattened body adapted to span the distance between the upper extender tube 62 and the lower extender tube 64 for slidable translation therealong. The lower shell bracket 40 comprises a planar central wall 150 transitioning along a first edge to a lower arcuate wall 156 and along a second edge to an upper arcuate wall 158. The lower arcuate wall 156 transitions to a lower mounting flange 152 and the upper arcuate wall 158 transitions to an upper mounting flange 154. The lower arcuate wall 156 defines a lower tube channel 160 adapted for slidable communication with the lower extender tube 64. The upper arcuate wall 158 defines an upper tube channel 162 adapted for slidable communication with the upper extender tube 62. The central wall 150, the lower mounting flange 152, and the upper mounting flange 154, are provided with a plurality of suitable fastener apertures 166 for attaching the lower shell bracket 40 to the shell 20. A hollow, cylindrical, tube 164 extends orthogonally through the central wall 150 intermediate the lower tube channel 160 and the upper tube channel 162.

Figure 8:
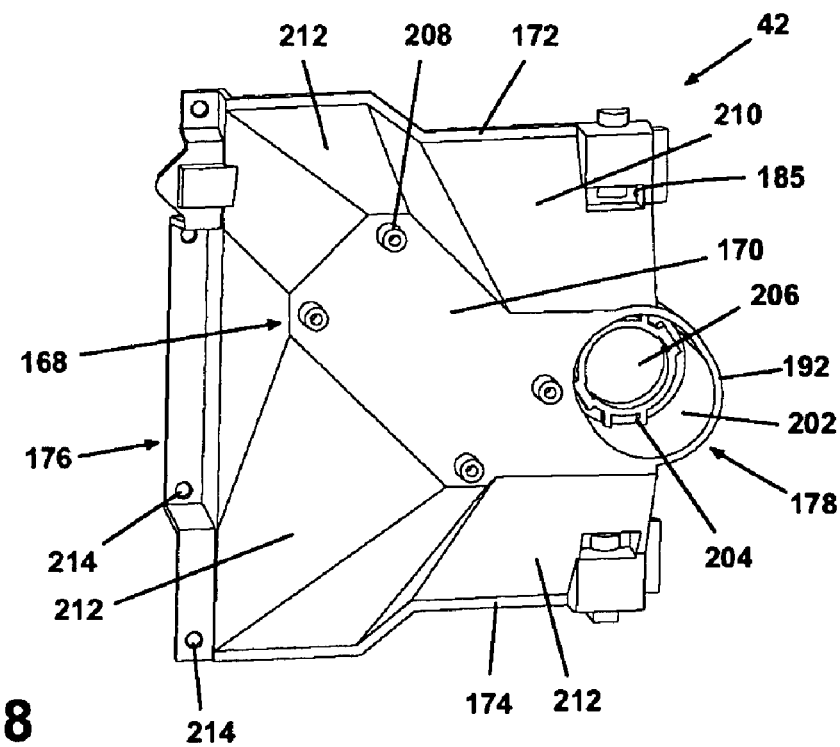
FIG. 8 is a front perspective view of an upper shell bracket comprising a portion of the dual-arm bracket assembly shown in FIG. 3.
Figure 9:
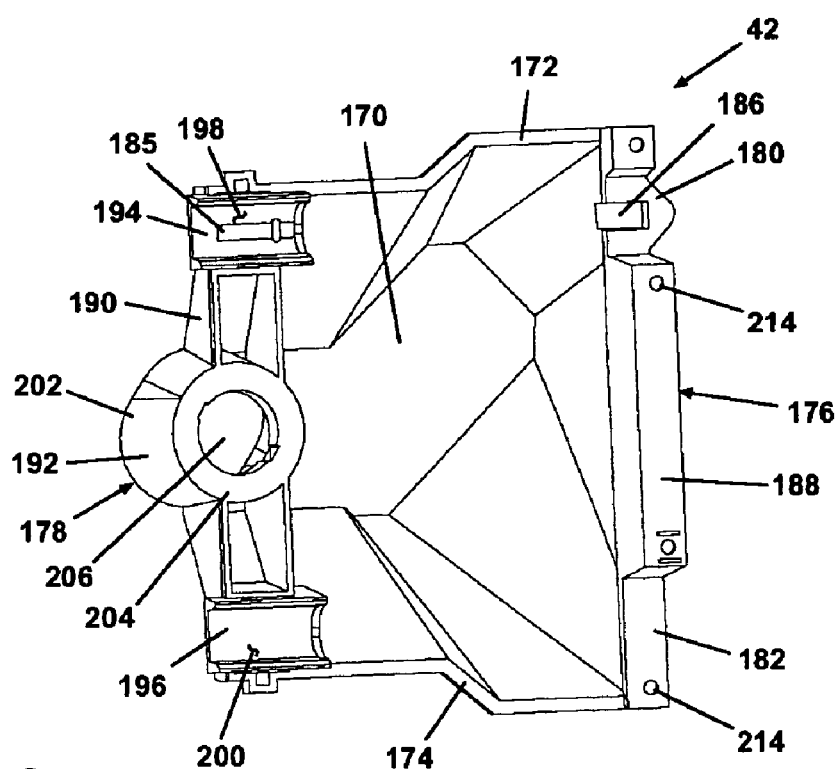
FIG. 9 is a rear perspective view of the upper shell bracket shown in FIG. 8.

Referring now to FIGS. 8 and 9, an upper shell bracket 42 is an irregularly-shaped body adapted to span the distance between the upper extender tube 62 and the lower extender tube 64 for slidable translation therealong in cooperative communication with the lower shell bracket 40. The upper shell bracket 42 comprises a tilt actuator mounting pedestal 168 terminating along a first edge in an upper lip 172 and along a second edge in a lower lip 174, an outer bridge 176, and an inner bridge 178. The tilt actuator mounting pedestal 168 comprises an irregularly-shaped planar rear wall 170 generally parallel to and spaced away from the upper lip 172 and the lower lip 174. The rear wall 170 is connected to the upper lip 172, the lower lip 174, the outer bridge 176, and the inner bridge 178 through an inclined perimeter wall 210 comprising a plurality of planar tetragonal inclined wall segments 212. The rear wall 170 is provided with a plurality of tilt actuator mounting posts 208 extending generally orthogonally therefrom and adapted for mounting the tilt actuator 24 to the rear wall 170 using conventional fasteners, such as threaded screws.

The outer bridge 176 is a generally wall-like structure extending between the upper lip 172 and the lower lip 174, and comprising a center wall 188 intermediate an upper tube support ledge 180 and a lower tube support ledge 182 and extending away from the tube support ledges 180, 182. The center wall 188 and the tube support ledges 180, 182 are provided with a plurality of apertures 214 therethrough for attaching the upper shell bracket 42 to the shell 20. The upper tube support ledge 180 is also provided with a cylinder-shaped tube stop 184 extending orthogonally therefrom and a slot 186 extending therethrough adjacent the tube stop 184.

The inner bridge 178 is a generally elongated, frame-like structure extending between the upper lip 172 and the lower lip 174, and spaced away from the outer bridge 176. The inner bridge 178 comprises a frame wall 190 having a housing 192 intermediate the upper lip 172 and the lower lip 174. The frame wall 190 terminates at the upper lip 172 in an upper channel wall 194 defining an upper tube channel 198 therethrough in coaxial alignment with the upper tube support ledge 180. The frame wall 190 also terminates at the lower lip 174 in a lower channel wall 196 defining a lower tube channel 200 therethrough in coaxial alignment with the lower tube support ledge 182. The housing 192 is a hollow receptacle in the general shape of a truncated cone comprising a perimeter housing wall 202 terminating at one end in an annular end wall 204 defining a circular aperture 206 therethrough.

As can be seen from the drawings, a slot 185 is formed in the upper channel wall 194 which is adapted to receive the upper tube boss 72 on the tube assembly 60. An outer end of the slot 185 defines an outer range of movement of the upper shell bracket 42 with respect to the tube assembly 60 and, thus, defines an outermost range of movement between the shell 20 and the arm assembly 16.

Furthermore, a slot 186 is formed in the upper tube support ledge 180 which is adapted to receive the upper tube boss 72 on the tube assembly 60. An inner end of the slot 186 defines an inner range of movement of the upper shell bracket 42 with respect to the tube assembly 60 and, thus, defines an innermost range of movement between the shell 20 and the arm assembly 16.

Figure 10:
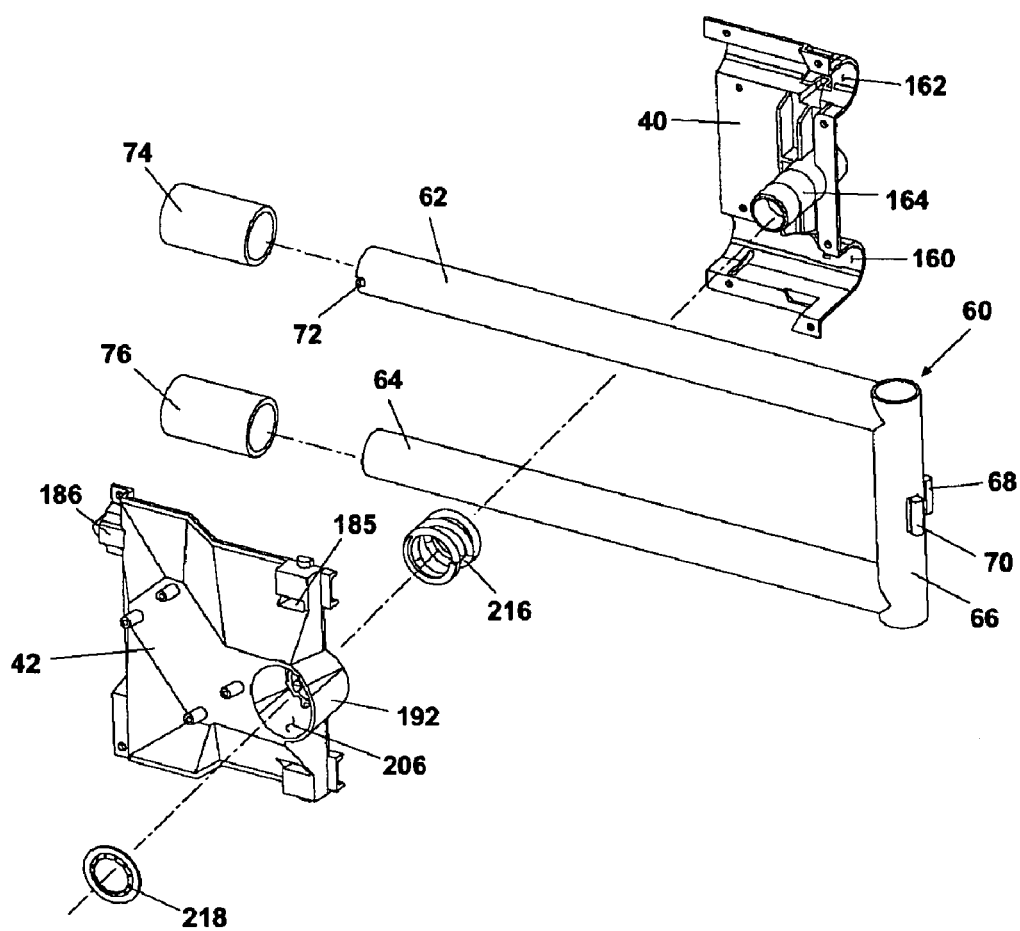
FIG. 10 is an exploded view showing the assembly of the dual-arm bracket assembly to a tube assembly comprising a portion of the rearview mirror assembly shown in FIG. 1.

The housing 192 is adapted for coaxial communication with the tube 164 when the lower shell bracket 40 and the upper shell bracket 42 are brought into operable communication with the tube assembly 60. As shown in FIG. 10, the tube 164 is inserted through the aperture 206 and a helical spring 216, and held in place within the housing 192 with a washer 218 inserted over the tube 164. As so assembled, the lower shell bracket 40 and the upper shell bracket 42 form a pair of spaced-apart, parallel tube channels for receipt of the upper extender tube 62 and the lower extender tube 64. The upper extender tube 62 will be frictionally held between the upper tube channel 162 and the upper tube channel 198, and the lower extender tube 64 will be frictionally held between the lower tube channel 160 and the lower tube channel 200. The frictional force between the tubes 62, 64 and the channels can be adjusted by positioning the washer 218 so as to adjust the spring compression of the spring 216 tending to urge the lower shell bracket 40 toward the upper shell bracket 42. Increasing the frictional force will increase the force required to translate the shell 20 relative to the tubes 62, 64, and the force required to dislodge the shell from a selected extended position. Decreasing the frictional force will decrease the force required to translate the shell 20 relative to the tubes 62, 64, and the force required to dislodge the shell from a selected extended position.

Figure 14:
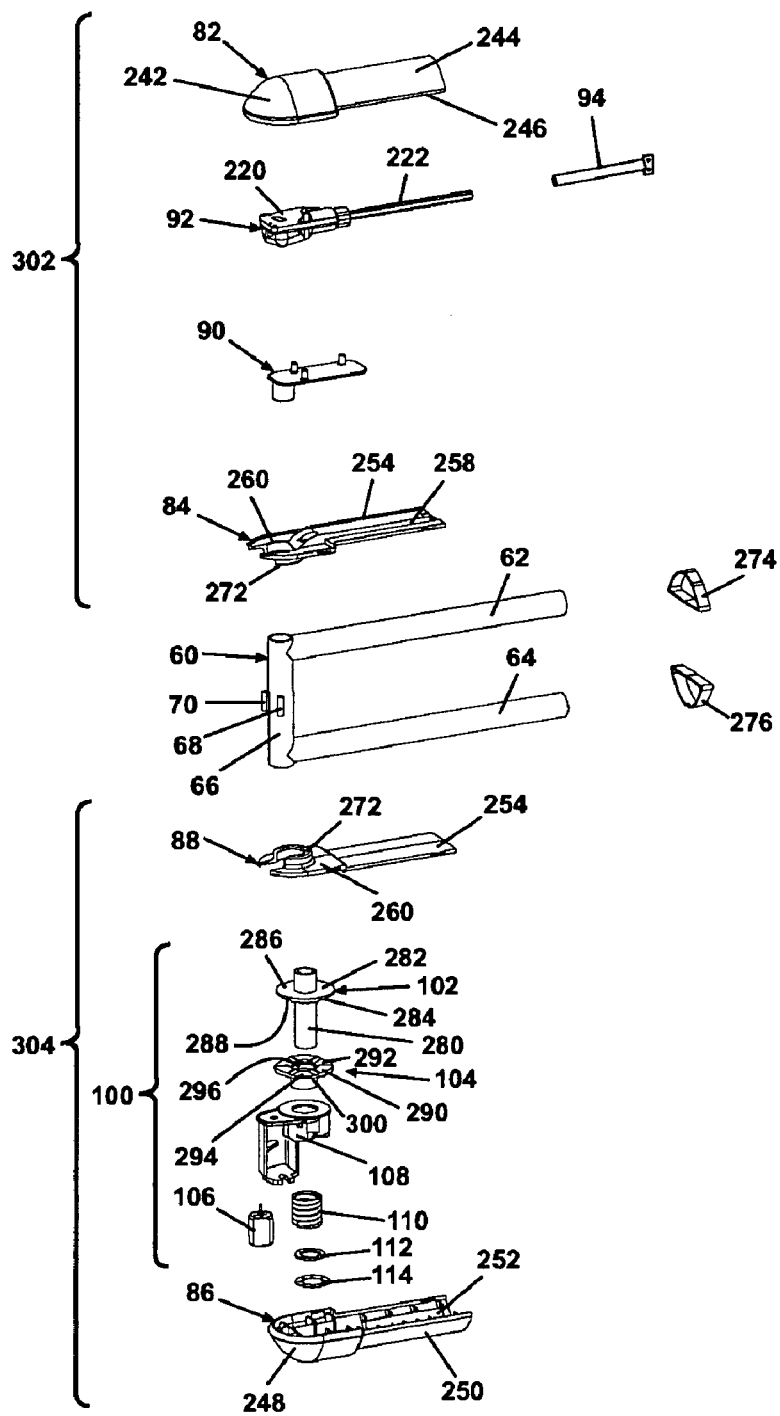
FIG. 14 is an exploded view of the tube assembly, the housing assembly, a powerextend actuator assembly, and a powerfold actuator assembly comprising a portion of the rearview mirror assembly shown in FIG. 1.

Referring again to FIG. 1 and to FIG. 14, the arm assembly 16 comprises the tube assembly 60, a powerextend actuator 92, and a pivot actuator assembly 100. The powerextend actuator 92 comprises a well-known motor-driven actuator comprising a suitable electric motor, such as a 12-volt DC motor, driving a helically threaded actuator drive shaft 222. A powerextend nut follower 94 is an elongated tube-shaped member having a threaded axial drive shaft bore 224 extending through a first end and terminating at a second end in a mounting flange 226 having an aperture 228 extending therethrough. The drive shaft bore 224 is adapted for threadable communication with the drive shaft 222 so that rotation of the drive shaft 222 will urge the nut follower 94 into linear translation relative to the powerextend actuator 92. The mounting flange 226 is adapted for fixed attachment to either the shell 20 or the upper shell bracket 42 by a fastener inserted through the aperture 228 into a mounting post 136 or a suitable receptacle in the upper shell bracket 42.

Figure 11:
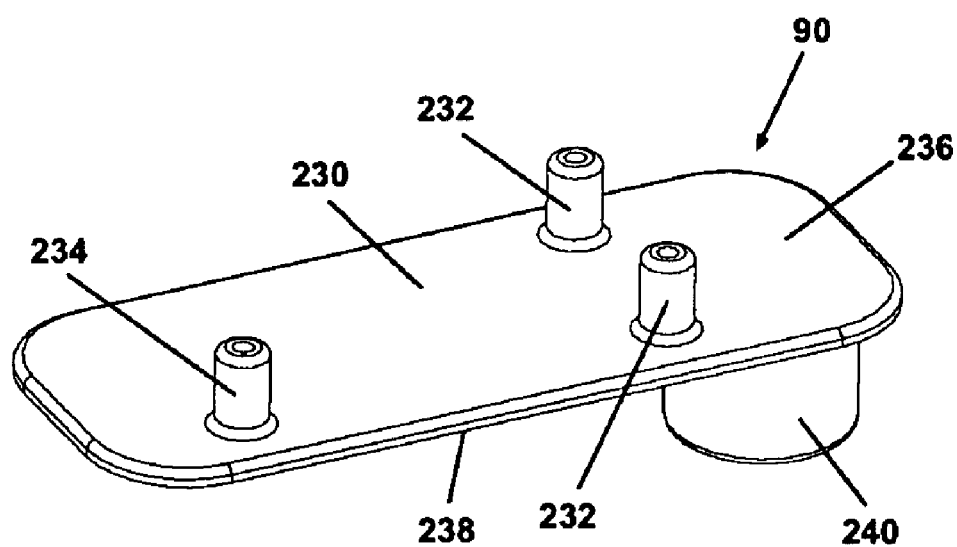
FIG. 11 is a perspective view of an adapter for mounting a powerextend actuator assembly to the tube assembly shown in FIG. 10.

As shown in FIG. 11, a powerextend adapter 90 comprises a generally flattened, irregularly-shaped body comprising a planar, generally rectangular actuator support plate 230 having an upper surface 236 and an opposed lower surface 238. A cylinder-shaped mounting pin 234 extends orthogonally away from the upper surface 236 at a first end thereof. A pair of cylinder-shaped stop pins 232 extend orthogonally away from the upper surface 236 at a second end thereof. A cylinder-shaped pivot boss 240 extends orthogonally away from the lower surface 238 at the second end thereof. The pivot boss 240 is adapted for slidable insertion in the pivot tube 66 so that the support plate 230 is mounted to the pivot tube 66 to extend collinearly along the upper extender tube 62. The mounting pin 234 is adapted for frictional insertion into a mating receptacle (not shown) in the powerextend actuator 92 to mount the powerextend actuator 92 to the tube assembly 60. The stop pins 232 cooperatively engage the powerextend actuator 92 to facilitate the fixed mounting of the actuator 92 to the powerextend adapter 90.

In an alternative embodiment, the powerextend actuator 92 can be attached to the tube assembly 60 so that the actuator drive shaft 222 and the powerextend nut follower 94 extend coaxially through the upper extender tube 62. A suitable bracketed joint (not shown) rigidly connecting the upper extender tube 62 to the pivot tube 66 would provide a suitable cradle for fixedly mounting the powerextend actuator 92 in the proper position relative to the upper extender tube 62.

The pivot actuator assembly 100 comprises a detent 102 and a powerfold assembly 104, adapted for pivoting the arm assembly 16 relative to the base assembly 14. The detent 102 is a somewhat cylinder-shaped body comprising a tube-like pivot post 280 having an annular upper driven plate 282 extending coaxially therearound. The upper driven plate 282 has a lower plate surface 284 and an opposed upper plate surface 286. The lower plate surface 284 is provided with a plurality of raised plate bosses 288 having a generally truncated pyramid shape extending radially at regularly-spaced intervals around the lower plate surface 284. The powerfold assembly 104 comprises an electric motor 106, such as a 12-volt DC motor, and a suitable reduction gear assembly enclosed within a suitable housing, a lower drive plate 290 adapted with suitable gear teeth for operable register with the reduction gear assembly, and a suitable bracket for rigidly attaching the housing to the base assembly 14. The lower drive plate 290 is an annular body having an upper plate surface 292 provided with a plurality of raised plate bosses 294 having a generally truncated pyramid shape extending radially at regularly-spaced intervals therearound, and an opposed lower plate surface 300. A circular post aperture 296 extends coaxially through the drive plate 290 for slidable insertion of the pivot post 280. The plate bosses 294 are adapted for cooperative interlocking register with the plate bosses 288 for cooperating rotation of the upper driven plate 282 with the lower drive plate 290. An example of interlocking bosses utilized in a drive plate assembly is described in U.S. patent application Ser. No. 10/420,433, filed Apr. 22, 2003, entitled "Vehicular Mirror System With At Least One Of Power-Fold And Power-Extend Functionality," which, in pertinent part, is incorporated herein.

A helical spring 110 is adapted for slidable insertion over the pivot post 280 and held to the pivot post 280 through a washer 112 and a palnut 114 inserted over and fixedly secured to the pivot post 280. As so assembled, the spring 110 will bear against the lower surface 300 to urge the upper surface 292 of the lower drive plate 290 against the lower surface 284 of the upper driven plate. The pivot post 280 is inserted into the pivot tube 66 so that the upper plate surface 286 communicates with the pivot tube 66. The pivot post 280 is fixedly attached to the pivot tube 66 through a suitable fastener, such as a screw, a rivet, or other well-known connecting device.

When the plate bosses 288 and the plate bosses 294 are cooperatively engaged, the detent 102 will rotate relative to the powerfold assembly 104 with the rotation of the lower drive plate 290. This will urge the rotation of the pivot tube 66 and the tube assembly 60 to rotate the tube assembly 60 between a folded position and an unfolded position. The bosses 288, 294 also enable the mirror assembly 10 to be manually folded when sufficient pivoting force is applied to the mirror assembly 10 to cause the bosses 288, 294 to ride over each other against the force of the spring 110.

Figure 12:
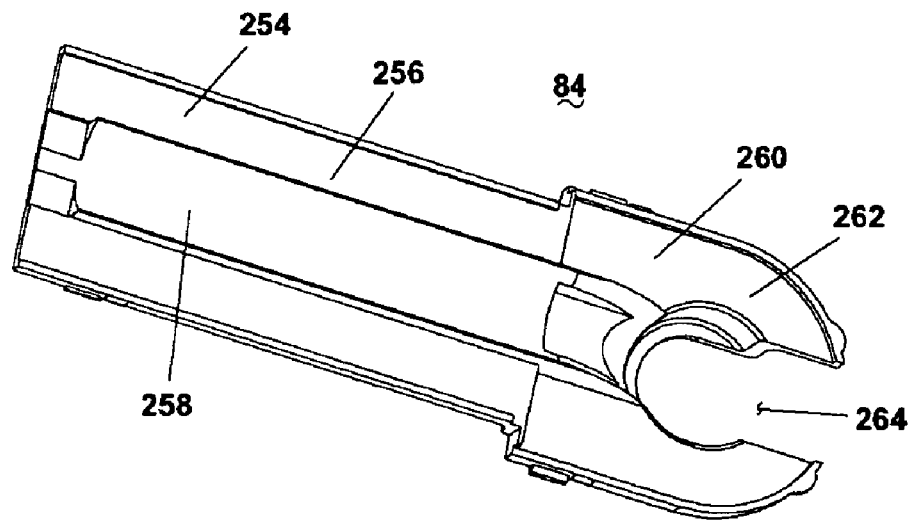
FIG. 12 is a perspective view of the interior of a portion of a housing assembly adapted to enclose a portion of the tube assembly shown in FIG. 10.
Figure 13:
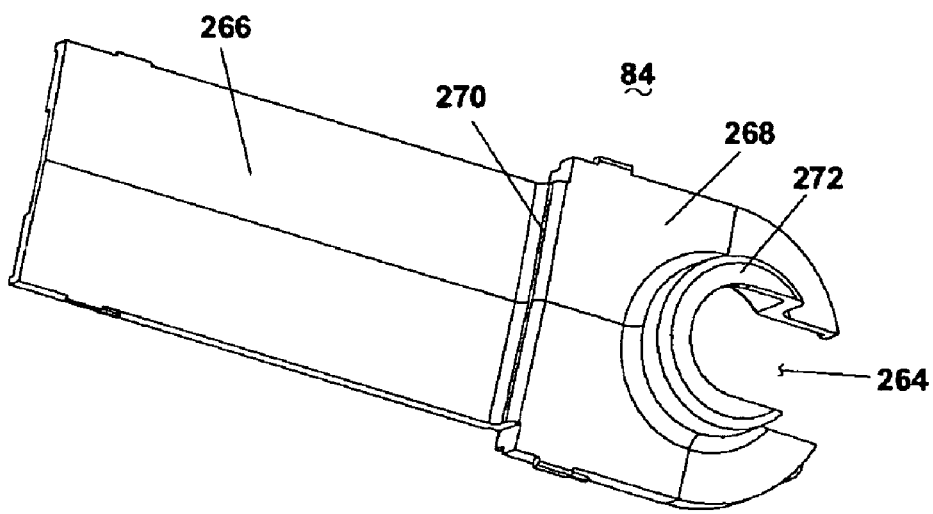
FIG. 13 is a perspective view of the exterior of the portion of the housing assembly shown in FIG. 12.

Referring to FIGS. 12-14, an upper arm top cover 82 is an elongated shell-like member comprising a bulbous head 242, and an arm 244 having a generally D-shaped cross-section. The head 242 is adapted to enclose the powerextend actuator 92, and the arm is adapted to enclose the drive shaft 222. A channelway 246 extends through the arm 244 into the head 242 and is adapted for slidable receipt of the upper extender tube 62. An upper arm bottom cover 84 is an elongated plate-like member comprising an arm portion 254 and a pivot portion 260, adapted for cooperative register with the head 242 and the arm 244, respectively, to form an upper shell 302 for enclosing the powerextend actuator 92 and the upper extender tube 62. The arm portion 254 comprises an inner surface 256 having an elongated, arcuate channel 258 extending coaxially therealong and adapted for cradling register with the upper extender tube 62. The pivot portion 260 comprises an inner surface 262 and a radial tube slot 264 extending therethrough in coaxial alignment with the channel 258. The pivot portion 260 also comprises an outer surface 268 in opposed juxtaposition to the inner surface 262, having a generally C-shaped pivot boss 272 extending orthogonally therefrom coaxial with the pivot portion 260. The arm portion 254 comprises an outer surface 266 in opposed juxtaposition to the inner surface 256. The arm portion 254 is offset from the pivot portion 260 by a transition wall 270 extending generally orthogonally between the arm portion 254 and the pivot portion 260. The upper arm top cover 82 is brought into cooperative register with the upper arm bottom cover 84 so that the upper extender tube 62 will be cradled between the channelway 246 and the channel 258

A lower arm top cover 86 is an elongated shell-like member comprising a bulbous head 248, an arm 250, and a channelway 252 similar to the arm 244 and the channelway 246. The head 248 is adapted to enclose the pivot actuator assembly 100. The lower arm bottom cover 88 is identical to the upper arm bottom cover 84 and comprises an arm portion 254 having an arcuate channel 258 and a pivot portion 260. The lower arm top cover 86 is brought into cooperative register with the lower arm bottom cover 88 so that the lower extender tube 64 will be cradled between the channelway 252 and the channel 258, to form a lower shell 304 for enclosing the powerful assembly 104 and the lower extender tube 64.

An upper sleeve plug 78 is a D-shaped annular body conforming to the cross-sectional shape of the upper arm sleeve 48 and adapted for slidable insertion into the upper arm sleeve 48, into which the upper shell 302 is slidably inserted. A lower sleeve plug 80 is a D-shaped annular body conforming to the cross-sectional shape of the lower arm sleeve 50 and adapted for slidable insertion into the lower arm sleeve 50 into which the lower shell 304 is slidably inserted. The upper sleeve plug 78 is provided with an aperture (not shown) in cooperative register with the fastener bore 144 for fixedly attaching the plug 78 into the upper sleeve channelway 140. The lower sleeve plug 80 is provided with an aperture (not shown) in cooperative register with the fastener boss 146 for fixedly attaching the plug 80 into the lower sleeve channelway 142. The upper shell 302 and the lower shell 304 are then inserted through the plugs 78, 80, respectively, into the channelway 140, 142, respectively, for slidable translation of the shell 20 relative to the tube assembly 60. The plugs 78, 80 are preferably fabricated of a semi-rigid, plastic material providing both sealing and low friction characteristics, such as POM (acetal), or a rubber such as Santoprene®, to prevent the introduction of moisture and debris into the channelways 140, 142 and the cavity 46, and facilitate the sliding of the shell 20 relative to the shells 302, 304.

As shown in FIGS. 15-22, the base assembly 14 comprises a base frame 120, a detent liner 124, and a detent clamp 126. The base frame 120 is an irregularly-shaped body comprising a somewhat triangular-shaped base wall 330, a tube bearing pedestal 332, and a retainer pedestal 336. The base wall 330 is provided with a plurality of apertures 366 therethrough adapted for mounting the base assembly 120 to the vehicle in a well-known manner using generally conventional fasteners (not shown). The tube bearing pedestal 332 comprises a generally rectilinear-shaped perimeter wall extending generally orthogonally from the base wall 330 and comprising a tube cradle 334 having a first cradle wall 338, a second cradle wall 340, and a pedestal wall 342. The first cradle wall 338 is provided with a first arcuate surface 344 to form a first cradle 348. The second cradle wall 340 is provided with a second arcuate surface 346 to form a second cradle 350. The walls 338, 340, 342 comprise a perimeter structure defining a well-like spring receptacle 354. The walls 338, 340 are provided with a plurality of apertures 352 for receipt of fasteners therein.

The retainer pedestal 336 is a generally rectilinear, solid, cube-like body extending orthogonally from the base wall 330. Extending from the pedestal wall 342 is a generally rectilinear, elongated, cube-like retainer bearing 356 comprising a retainer pin channelway 358 extending longitudinally therethrough. Adjacent the retainer bearing 356 is a retainer pin stop 360 in coaxial alignment with the retainer pin channelway 358.

The base wall 330 terminates along one edge in a mounting flange 362 having a plurality of apertures 364 therethrough for mounting the base assembly 120 to the vehicle in a well-known manner.

Figure 19:
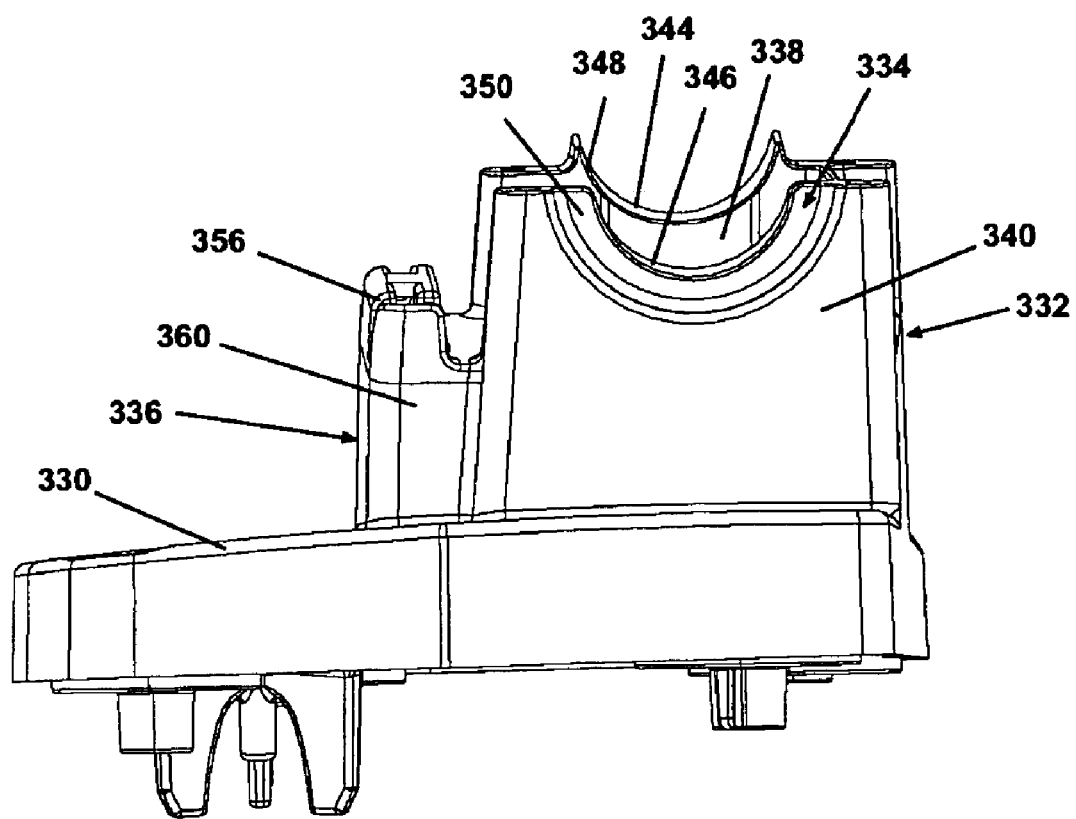
FIG. 19 is a side view of the base shown in FIG. 18.

As shown in FIG. 19, the distance of the first arcuate surface 344 away from the base wall 330 is somewhat greater than the distance of the second arcuate surface 346 away from the base wall 330. Thus, an elongated member, such as a tube or a cylinder, supported against the arcuate surfaces 344, 346 will be inclined from the first arcuate surface 344 to the second arcuate surface 346 relative to the base wall 330.

Referring also to FIGS. 20 and 21, the detent clamp 126 is a somewhat arcuate frame-like body comprising an arcuate wall 370 transitioning to a rearward flange 372 and a forward flange 374 in generally spaced-apart, coplanar juxtaposition. The flanges 372, 374 are provided with a plurality of mounting apertures 376 therethrough. The arcuate wall 370 is separated from the rearward flange 372 by a rearward slot 373 defining a forward stop edge 378 at the rearward flange 372. The arcuate wall 370 is separated from the forward flange 374 by a forward slot 375 defining a rearward stop edge 379 at the forward flange 374. The flanges 372, 374 are inclined relative to the arcuate wall 370. The detent clamp 126 is adapted to be attached to the tube bearing pedestal 332 by insertion of fasteners through the apertures 376 into the apertures 352 to provide a circular channelway defined by the arcuate surfaces 344, 346 and the arcuate wall 370. The channelway will be inclined relative to the base wall 330 to maintain the channelway in a generally vertical orientation when the base assembly 14 is attached to the vehicle.

Referring to FIG. 22, a detent liner 124 is a generally tube-like body comprising an arcuate wall 380 terminating in an upper arcuate band at 382 and a lower arcuate band at 384. The upper arcuate band 382 is separated longitudinally by an upper slot at 386 to form a pair of circumferential band arms 392, 394. The lower arcuate band 384 is separated longitudinally by a lower slot 388 in collinear alignment with the upper slot 386 to form a pair of circumferential band arms 396, 398. The bands 382, 384 define a partially circumferential center slot 390. The slots 386, 388 enable the band arms 392-398 to flex independently. The detent liner 124 is preferably manufactured of a plastic, such as nylon or PET.

Figure 15:
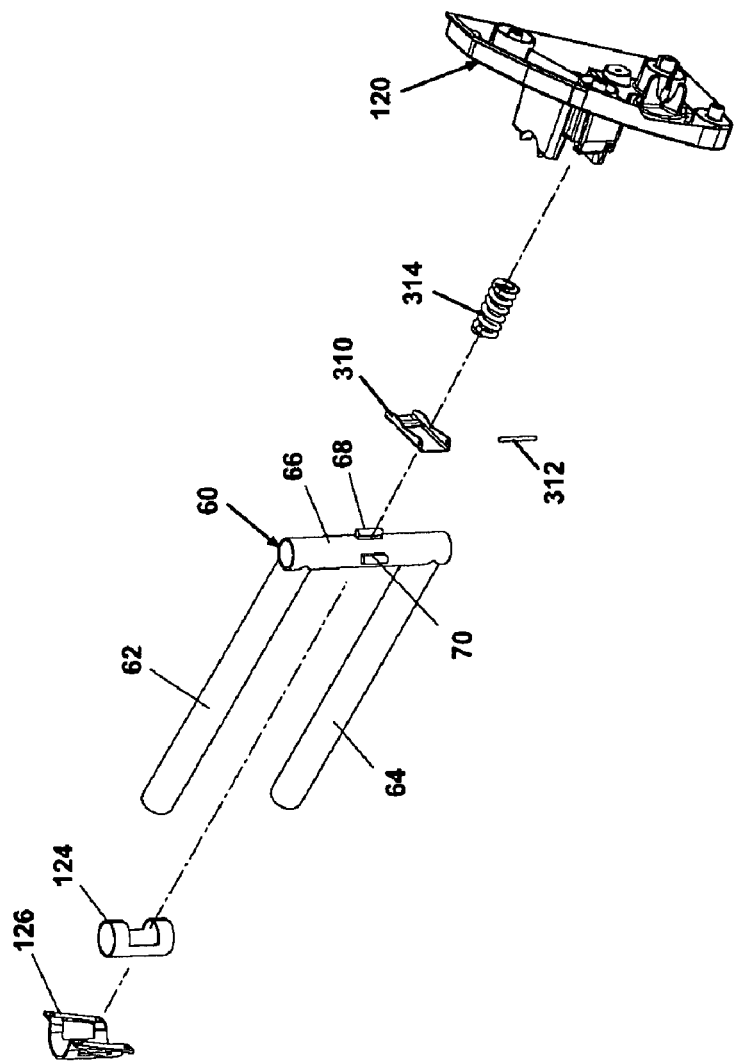
FIG. 15 is an exploded view of the tube assembly and a base comprising a portion of the rearview mirror assembly shown in FIG. 1 showing the attachment of the tube assembly to the base through a detent assembly.
Figure 16:
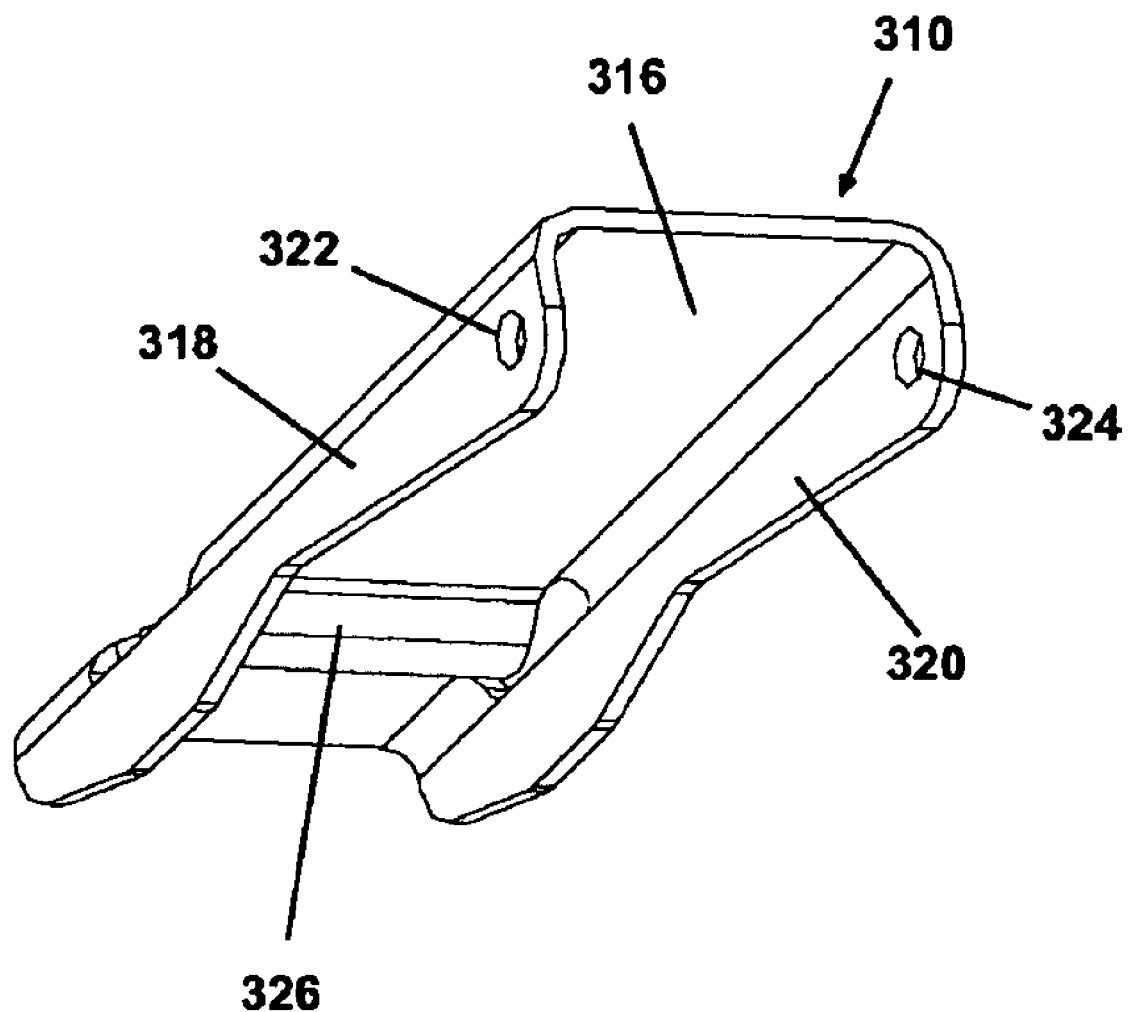
FIG. 16 is a first perspective view of a retainer comprising a portion of the detent assembly shown in FIG. 15.

A retainer 310 is a generally flattened, plate-like body comprising an elongated planar main wall 316 transitioning along a first edge to an orthogonal first sidewall 318 and along a second edge to an orthogonal second sidewall 320. The first side wall 318 is provided at a first end with a pin aperture 322 therethrough. The second side wall 320 is provided at a first end with a pin aperture 324 therethrough in coaxial alignment with the pin aperture 322. The main wall 316 is provided adjacent a second end with a recessed arcuate or V-shaped crimp 326 defining a channel in the main wall 316. The apertures 322, 324 are adapted for slidable receipt of a retainer pin 312 as shown in FIG. 15.

The retainer 310 is pivotally attached to the retainer bearing 356 by inserting the retainer pin 312 through the apertures 322, 324 and the retainer pin channelway 358. A helical spring 314 is received in the spring receptacle 354 and is adapted to bear against the retainer 310 to pivotally bias the retainer away from the tube cradle 334. Alternatively, the retainer can comprise a resilient material, such as spring steel, which is biased away from the tube cradle in an at-rest configuration, with the retainer fixedly attached to a retainer bearing and the spring 314 omitted.

The mirror assembly 10 can be assembled in one of three embodiments: an assembly comprising both powerfold and powerextend functionality, an assembly comprising powerfold and manual extend functionality, and an assembly comprising manual fold and powerextend functionality. Each embodiment comprises an identical base assembly 14, reflective element assembly 18, shell 20, and tube assembly 60. The first embodiment comprises both the powerextend actuator 92, the pivot actuator assembly 100, and a shell bracket assembly 22 comprising only the upper shell bracket 42. The second embodiment comprises the pivot actuator assembly 100 and a shell bracket assembly 22 comprising the lower shell bracket 40 and the upper shell bracket 42. The third embodiment comprises the powerextend actuator 92 and a shell bracket assembly 22 comprising only the upper shell bracket 42.

In the first embodiment, the powerextend actuator 92 is installed on the powerextend adapter 90 to hold the powerextend actuator 92 to the tube assembly 60 so that the actuator drive shaft 222 extends longitudinally through the upper arm sleeve 48. The powerextend nut follower 94 is threaded onto the actuator drive shaft 222 and attached to the shell 20 or the upper shell bracket 42 through a suitable fastener inserted through the aperture 228 into a mounting post 136 or a suitable receptacle in the upper shell bracket 42. The upper linear bearing 74 and the lower linear bearing 76 are fixedly attached either to the shell 20 or the upper shell bracket 42 to slidably receive the upper extender tube 62 and the lower extender tube 64, respectively. As the powerextend actuator 92 is selectively activated to translate the powerextend nut follower 94 along the drive shaft 222, the shell 20 and the upper shell bracket 42 will be translated toward or away from the vehicle as the bearings 74, 76 slidably translate along the tubes 62, 64.

Selective operation of the motor 106 in the pivot actuator assembly 100 will urge the rotation of the drive plate 290 which will urge the rotation of the driven plate 282 and the tube assembly 60 to fold the mirror along or extend the mirror away from the vehicle. The rearward stop 68 will prevent over rotation of the tube assembly 60 against the vehicle by contacting the rearward stop edge 378 of the detent clamp 126. Similarly, the forward stop 70 will prevent over rotation of the tube assembly 60 away from the vehicle by contacting the forward stop edge 379 of the detent clamp 126.

In the second embodiment, the powerextend actuator 92 is not utilized, and the extend functionality is accomplished manually. The lower shell bracket 40 is attached to the upper shell bracket 42 as previously described herein to frictionally engage the tubes 62, 64. The frictional force between the bracket assembly 22 and the tubes 62, 64 can be adjusted by adjusting the spring compression to maintain the shell 20 in a selected extended position during anticipated normal operating conditions while enabling the translation of the shell 20 relative to the tube assembly 60 through the application of sufficient translating force. The pivot actuator assembly 100 will operate to fold and unfold the mirror assembly 10 relative to the vehicle as described above.

In the third embodiment, the powerextend actuator 92 and the upper shell bracket 42 are assembled and operated as described for the first embodiment. The lower shell bracket 40 is not used, nor is the pivot actuator assembly 100. The fold functionality is accomplished manually, in the manner described in U.S. Pat. No. 6,439,730 to Foote et al., by communication of the retainer 310 with at least one of the rearward stop 68 and the forward stop 70. Overextension of the mirror assembly 10 is controlled by the communication of the stops 68, 70 with the stop edges 378, 379, as previously described.

The herein-described vehicle mirror assembly 10 has a significantly stronger pivot connection than the prior art mirror assemblies. The use of the tube cradle 334 to support the tube assembly 60 increases the strength of the cantilevered arm assembly 16 by providing support at two spaced-apart bearing locations on the pivot tube 66. It will be understood that the bearing locations and the ends in which the power functionality assemblies are mounted can be interchanged, or alternate locations provided without departing from the scope of this invention. Further, the mounting location of the tube cradle can also be interchanged or relocated without departing from the scope of this invention as well. The vehicle mirror assembly 10 can be readily utilized with fully motorized powerfold/powerextend functionality. Alternatively, one or both of the powerfold and powerextend actuator assemblies can be removed for a partially or fully manually operated mirror assembly 10.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

The invention claimed is:

1. A vehicular mirror system, comprising:
   a base adapted to be mounted to the vehicle, the base comprising a cradle extending outwardly therefrom;
   a reflective element assembly for providing a rearward reflective view to an operator of the motor vehicle;
   a support tube assembly comprising a pair of arms interconnected by a support element, wherein the pair of arms are attached to the reflective element assembly and the support element is received in the cradle; and
   a retainer mounted to the base and extending across at least a portion of the cradle to retain the support element therein;
   wherein the support of the support tube assembly by the cradle has increased strength and resistance to vibration while enabling the support tube assembly to pivot relative to the base.

2. A vehicular mirror system according to claim 1, and further comprising a clamp adapted for attachment to the cradle to form a cylindrical channelway.

3. A vehicular mirror system according to claim 1, wherein the support tube assembly comprises a pair of parallel extender tubes rigidly attached at one end to a pivot tube, the pivot tube adapted to be received in the channelway with the extender tubes extending outwardly from the base.

4. A vehicular mirror system according to claim 1, wherein the support of the support tube assembly by the cradle has increased strength and resistance to vibration while enabling the support tube assembly to pivot relative to the base.

5. A vehicular mirror system according to claim 1, and further comprising a motorized powerfold assembly mounted to at least one of the base and the reflective element assembly for selectively pivoting the support tube assembly alongside the vehicle or laterally outwardly from the vehicle.

6. A vehicular mirror system according to claim 1, and further comprising a motorized powerextend assembly mounted to at least one of the base and the reflective element assembly for selectively extending the reflective element assembly laterally outwardly from the vehicle or inwardly toward the vehicle.

7. A vehicular mirror system according to claim 1, wherein the at least one stop comprises a cylindrical body attached to an outer surface of the support tube assembly.

8. A vehicular mirror system according to claim 7, and further comprising two stops attached to the support element, the first stop corresponds to a first position of the reflective element assembly laterally outwardly from the vehicle, and the second stop corresponds to a second position of the reflective element assembly inwardly toward the vehicle.

9. A vehicular mirror system according to claim 7, wherein the retainer comprises a plate having a crimp therein for receiving a stop.

10. A vehicular mirror system according to claim 9, wherein the retainer is movably attached to the base adjacent the cradle.

11. A vehicular mirror system according to claim 10, wherein the retainer is biased away from the cradle and toward the support tube assembly.

12. A vehicular mirror system according to claim 11, wherein the retainer is biased by a spring.

* * * * *